(12) United States Patent
Bae

(10) Patent No.: US 12,487,338 B2
(45) Date of Patent: Dec. 2, 2025

(54) LIDAR SENSOR AND METHOD FOR REMOVING NOISE OF THE SAME

(71) Applicant: SOLIDVUE, INC., Suwon-si (KR)

(72) Inventor: Jun Han Bae, Hwaseong-si (KR)

(73) Assignee: SOLIDVUE, INC., Seongnam-si (KR)

( * ) Notice: Subject to any disclaimer, the term of this patent is extended or adjusted under 35 U.S.C. 154(b) by 862 days.

(21) Appl. No.: 17/702,397

(22) Filed: Mar. 23, 2022

(65) Prior Publication Data
US 2022/0317250 A1 Oct. 6, 2022

(30) Foreign Application Priority Data
Apr. 1, 2021 (KR) .................. 10-2021-0042678

(51) Int. Cl.
*G01S 7/48* (2006.01)
*G01S 7/481* (2006.01)
*G01S 7/484* (2006.01)
*G01S 7/486* (2020.01)

(52) U.S. Cl.
CPC ............ *G01S 7/484* (2013.01); *G01S 7/4816* (2013.01); *G01S 7/486* (2013.01)

(58) Field of Classification Search
None
See application file for complete search history.

(56) References Cited

U.S. PATENT DOCUMENTS 11,668,826 B2    6/2023   Hata et al. ............... G01S 17/10
2005/0251039 A1* 11/2005  Chalana .............. G01S 15/8993
                                                          600/437

(Continued)

FOREIGN PATENT DOCUMENTS

JP    2013-235390 A    11/2013
KR    10-2019-0131050 A    11/2019
WO    WO 2018/160886 A1    9/2018

(Continued)

OTHER PUBLICATIONS

Office Action mailed on Dec. 29, 2022, issued to corresponding Korean Application No. 10-2021-0042678.

(Continued)

*Primary Examiner* — Hovhannes Baghdasaryan
(74) *Attorney, Agent, or Firm* — Stein IP, LLC

(57) ABSTRACT

The present invention relates to a Lidar sensor capable of removing background noise and a method of removing the noise of the same, and the Lidar sensor may include: a light reception part configured to sense reflected light reflected from an object; a weight generation part configured to generate a weight based on a sensing rate of the reflected light of the light reception part; a first histogram processing unit configured to perform histogram processing of a sensing signal of the light reception part based on the generated weight, and extract data values greater than or equal to a first reference value from bins of the histogram to firstly remove noise; and a second histogram processing unit configured to accumulate the data values extracted from the first histogram processing unit to perform histogram processing, and extract accumulated data values greater than or equal to a second reference value from bins of the histogram in which the data values are accumulated to secondarily remove the noise.

14 Claims, 3 Drawing Sheets

(56) References Cited

U.S. PATENT DOCUMENTS

2019/0056497 A1* 2/2019 Pacala ................ G01S 7/497
2021/0183016 A1 6/2021 Toyoura

FOREIGN PATENT DOCUMENTS

| WO | WO 2019/044571 A1 | 3/2019 |
| WO | WO 2021/001261 A1 | 1/2021 |
| WO | WO 2021/046547 A1 | 3/2021 |

OTHER PUBLICATIONS

Notice of Allowance mailed on May 18, 2023, issued to corresponding Korean Application No. 10-2021-0042678.

\* cited by examiner

LIDAR SENSOR AND METHOD FOR REMOVING NOISE OF THE SAME

CROSS-REFERENCE TO RELATED APPLICATIONS

This application claims the benefit of Korean Application No. 10-2021-0042678, filed Apr. 1, 2021, in the Korean Intellectual Property Office. All disclosures of the document named above are incorporated herein by reference.

BACKGROUND

1. Technical Field

The present invention relates to a Lidar sensor, and more specifically, to a Lidar sensor capable of removing background noise and a method of removing the noise of the same.

2. Description of Related Art

Generally, a Lidar sensor is a device which emits a laser pulse and receives light reflected from a surrounding target object to precisely draw the surroundings by measuring a distance to an object, a direction, a material, a characteristic, and the like.

The Lidar sensor is used for more precise physical property observation in the atmosphere and distance measurement using advantages of a laser capable of generating a pulse signal having a high energy density and a short period.

Further, the Lidar sensor may be classified into a time-of-flight (TOF) method and a phase-shift (PS) method according to a modulation method of a laser signal.

The TOF method is a method of measuring a distance by emitting a pulse signal from the laser and measuring the time of the pulse signal reflected back from objects within a measurement range, and the PS method is a method of calculating the time and distance by emitting a laser beam which is continuously modulated with a specific frequency and measuring an amount of a phase change of the signal reflected back from objects within a measurement range.

When this Lidar sensor is applied in an external environment, high-sensitivity signal sensing and noise removal are essential due to various types of background noise such as sunlight, dark noise, and the like.

However, in the Lidar sensor, when an excess voltage, which is a reverse voltage of a single photon avalanche photo diode (SPAD), is increased to increase sensitivity, there is a problem in that the sensitivity is improved while noise is also increased.

Accordingly, in the future, the development of a Lidar sensor capable of performing both high-sensitivity signal sensing and noise removal, as well as removing interference between Lidar sensors is required.

SUMMARY

1. Technical Problem

A technical objective of the present invention is to provide a Lidar sensor capable of performing both high-sensitivity signal sensing and noise removal by extracting only data values greater than or equal to a first reference value from bins of a histogram through a first histogram processing unit to firstly remove noise, and extracting only accumulated data values greater than or equal to a second reference value from bins of a histogram in which data values extracted from a second histogram processing unit are accumulated to secondarily remove noise, and a method of removing the noise of the same.

Further, another technical objective of the present invention is to provide a Lidar sensor capable of removing the interference noise between Lidar sensors by controlling a light emitting unit to vary a light pulse emission delay time and a light pulse time difference (TD) between first light and second light in response to the histogram processing performed by a first histogram processing unit, and a method of removing the noise of the same.

Technical problems to be solved by the present invention are not limited to the above-mentioned technical problems, and other technical problems which are not mentioned will be clearly understood by those skilled in the art from the following disclosure.

2. Solution to Problem

A Lidar sensor according to one embodiment of the present invention includes: a light reception part configured to sense reflected light reflected from an object; a weight generation part configured to generate a weight based on a sensing rate of the reflected light of the light reception part; a first histogram processing unit configured to perform histogram processing of a sensing signal of the light reception part based on the generated weight, and extract data values greater than or equal to a first reference value from bins of the histogram to firstly remove noise; and a second histogram processing unit configured to accumulate the data values extracted from the first histogram processing unit to perform histogram processing, and extract the accumulated data values greater than or equal to a second reference value from bins of the histogram in which the data values are accumulated to secondarily remove the noise.

In an alternative embodiment of the Lidar sensor, the weight generation part may divide a plurality of single-photon avalanche diodes (SPADs) included in each light reception pixel of the light reception part into a plurality of sub-groups, may determine whether the number of SPADs which simultaneously sense the reflected light in the sub-groups is greater than or equal to a reference number, may generate a weight of the sensing signal based on the number of sub-groups greater than or equal to the reference number, and may output the generated weight to the first histogram processing unit.

In an alternative embodiment of the Lidar sensor, when determining whether the number of SPADs which simultaneously sense the reflected light in the sub-groups is greater than or equal to a reference number, the weight generation part may count the number of SPADs which simultaneously sense the reflected light in the sub-groups, may compare the number of counted SPADs and the preset reference number, and may classify sub-groups corresponding to the number of counted SPADs and may count the number of classified sub-groups when the number of counted SPADs is greater than or equal to the reference number.

In an alternative embodiment of the Lidar sensor, the first histogram processing unit may check whether the weight is generated when performing the histogram processing of the sensing signal, and may reflect the generated weight in the data value of the sensing signal to perform the histogram processing when the weight is generated.

In an alternative embodiment of the Lidar sensor, when checking whether the weight is generated, the first histogram processing unit may check whether the sensing signal is present when the weight is not generated, and may histogram-process the data value of the sensing signal as 1 when there is the sensing signal.

In an alternative embodiment of the Lidar sensor, when the noise is firstly removed, the first histogram processing unit may check whether the data value of each bin is greater than or equal to the first reference value, may calculate a difference value between the data value of the bin and the first reference value when the data value of the bin is greater than or equal to the first reference value, and may extract the calculated difference value and output the difference value to the second histogram processing unit.

In an alternative embodiment of the Lidar sensor, when checking whether the data value of each bin is greater than or equal to the first reference value, the first histogram processing unit may process the data value of the corresponding bin as noise and remove the noise when the data value of the bin is smaller than the first reference value.

In an alternative embodiment of the Lidar sensor, when the histogram processing is performed, the second histogram processing unit may generate a bin corresponding to a first data value when receiving the first data value from the first histogram processing unit, may generate or accumulate a bin corresponding to a second data value when receiving the second data value from the first histogram processing unit, and may generate or accumulate a bin corresponding to an Nth data value when receiving the Nth data value from the first histogram processing unit In an alternative embodiment of the Lidar sensor, the second histogram processing unit may check whether the bin corresponding to the second data value is the same as the bin corresponding to the first data value when receiving the second data value from the first histogram processing unit, may accumulate the second data value to the first data value of the corresponding bin when the check result is the same, and may generate a new bin corresponding to the second data value when the check result is different.

In an alternative embodiment of the Lidar sensor, the second histogram processing unit may check whether the bin corresponding to the Nth data value is a previously generated bin when receiving the Nth data value from the first histogram processing unit, may accumulate the Nth data value to the data value of the previously generated bin when the bin is the previously generated bin according to the check result, and may generate a new bin corresponding to the Nth data value when the check result is different.

In an alternative embodiment of the Lidar sensor, when the noise is secondarily removed, the second histogram processing unit may check whether the Nth data value is the last data value when receiving the Nth data value from the first histogram processing unit, and may generate or accumulate a bin corresponding to the last data value and extract the accumulated data values greater than or equal to the second reference value from the bins of the histogram when the Nth data value is the last data value according to the check result.

In an alternative embodiment of the Lidar sensor, when checking whether the Nth data value is the last data value, the second histogram processing unit may check whether the Nth data value is the last data value based on the preset number of histogram processing.

In an alternative embodiment of the Lidar sensor, when the noise is secondarily removed, the second histogram processing unit may check whether the data value of each bin is greater than or equal to the second reference value, and may calculate a difference value between the data value of the bin and the second reference value, and then may extract and output the calculated difference value when the data value of the bin is greater than or equal to the second reference value.

In an alternative embodiment of the Lidar sensor, when checking whether the data value of each bin is greater than or equal to the second reference value, the second histogram processing unit may process the data value of the corresponding bin as noise and remove the noise when the data value of the bin is smaller than the second reference value.

In an alternative embodiment of the Lidar sensor, the second reference value of the second histogram processing unit may be different from the first reference value of the first histogram processing unit.

In an alternative embodiment of the Lidar sensor, the Lidar sensor may further include: a light emitting unit configured to emit first light and second light to the object; and an interference noise remover configured to control the light emitting unit to vary a light pulse emission delay time and a light pulse time difference (TD) between the first light and the second light in response to the histogram processing performed by the first histogram processing unit.

In an alternative embodiment of the Lidar sensor, the interference noise remover may check whether the first histogram processing unit performs first histogram processing, and may control the light emitting unit to differently vary emission start times of the first light and the second light and keep the light pulse time difference (TD) between the first light and the second light the same when the first histogram processing unit performs the first histogram processing.

In an alternative embodiment of the Lidar sensor, when checking whether the first histogram processing unit performs first histogram processing, the interference noise remover may control the light emitting unit to differently vary the emission start times of the first light and the second light so that a current light pulse emission delay time is different from a previous light pulse emission delay time, and make a current light pulse time difference (TD) different from a previous light pulse time difference when the first histogram processing unit performs Nth histogram processing other than the first histogram processing.

In an alternative embodiment of the Lidar sensor, the interference noise remover may differently vary a current light pulse emission delay time corresponding to performing the Nth histogram processing and a previous light pulse emission delay time corresponding to performing N−1th histogram processing, and may differently vary the current light pulse time difference (TD) corresponding to performing the Nth histogram processing and the previous light pulse time difference corresponding to performing the N−1th histogram processing.

In an alternative embodiment of the Lidar sensor, the Lidar sensor may further include a random number generation part configured to generate a two-dimensional random number, wherein the interference noise remover may vary the light pulse emission delay time and the light pulse time difference (TD) between the first light and the second light based on the two-dimensional random number.

In an alternative embodiment of the Lidar sensor, the random number generation part may include first and second single-photon avalanche diodes (SPADs), a light blocker configured to block light emitted to any one of the first and second SPADs, and a random number generator connected to the first and second SPADs to generate a random number in response to a pulse to be input.

Meanwhile, a method of removing the noise of a Lidar sensor including a light reception part, a weight generation part, a histogram processing unit, and an interference noise remover according to one embodiment of the present invention, includes: sensing, by the light reception part, reflected light reflected from an object; generating, by the weight generation part, a weight based on a reflected light sensing rate of the light reception part; performing, by the histogram processing unit, histogram processing of a sensing signal of the light reception part based on the generated weight, and extracting data values greater than or equal to a first reference value from bins of the histogram to firstly remove noise; and accumulating, by the histogram processing unit, the extracted data values to perform the histogram processing, and extracting accumulated data values greater than or equal to a second reference value from the bins of the histogram in which the data values are accumulated to secondarily remove the noise.

3. Advantageous Effects

Effects of a Lidar sensor according to the present invention and a method of removing the noise of the same will be described as follows.

In the present invention, both high-sensitivity signal sensing and noise removal can be performed by extracting only data values greater than or equal to a first reference value from bins of a histogram through a first histogram processing unit to firstly remove noise, and extracting only accumulated data values greater than or equal to a second reference value from bins of a histogram in which data values extracted from a second histogram processing unit are accumulated to secondarily remove noise.

Further, in the present invention, interference noise between Lidar sensors can be removed by controlling a light emitting unit to vary a light pulse emission delay time and a light pulse time difference (TD) between first light and second light in response to the histogram processing performed by the first histogram processing unit.

In addition, in the present invention, even when combined with a double histogram by increasing Vex, there is an effect in that the interference of an increased dark count rate due to a Vex increase can be nullified, and SPAD sensitivity (photon detection probability) increases due to the increased Vex.

Generally, the reason why Vex is not intentionally increased is because the DCR increases rapidly, however, in the present invention, since the increased Vex can be removed using the double histogram, noise can be removed even when Vex is intentionally increased.

An additional scope of applicability of the present invention will become apparent from the following detailed description. However, since it should be understood that various changes and modifications within the spirit and scope of the present invention can be clearly understood by those skilled in the art, it should be understood that the detailed descriptions and specific embodiments, such as preferred embodiments of the present invention, are given as only examples.

DETAILED DESCRIPTION OF EMBODIMENTS

Hereinafter, the present invention will be described in more detail with reference to the drawings.

The suffixes "module" and "unit" for components used in the following description are simply given in consideration of ease of writing the specification, and the "module" and "unit" may be interchangeably used.

Further, embodiments of the present invention will be described in detail with reference to the following accompanying drawings and the contents described in the accompanying drawings, but the present invention is not restricted or limited by the embodiments.

Currently widely used general terms are selected as much as possible as terms used in the specification while considering functions in the present invention, but these may vary according to the intention or custom of those skilled in the art or advent of a new technology. Further, in a specific case, there are terms arbitrarily selected by the applicant, and in this case, the meaning will be described in the description of the present invention. Accordingly, it is intended to clarify that the terms used in this specification should be interpreted based on the actual meaning of the terms and the contents throughout the specification, other than simple names of the terms.

Figure 1:
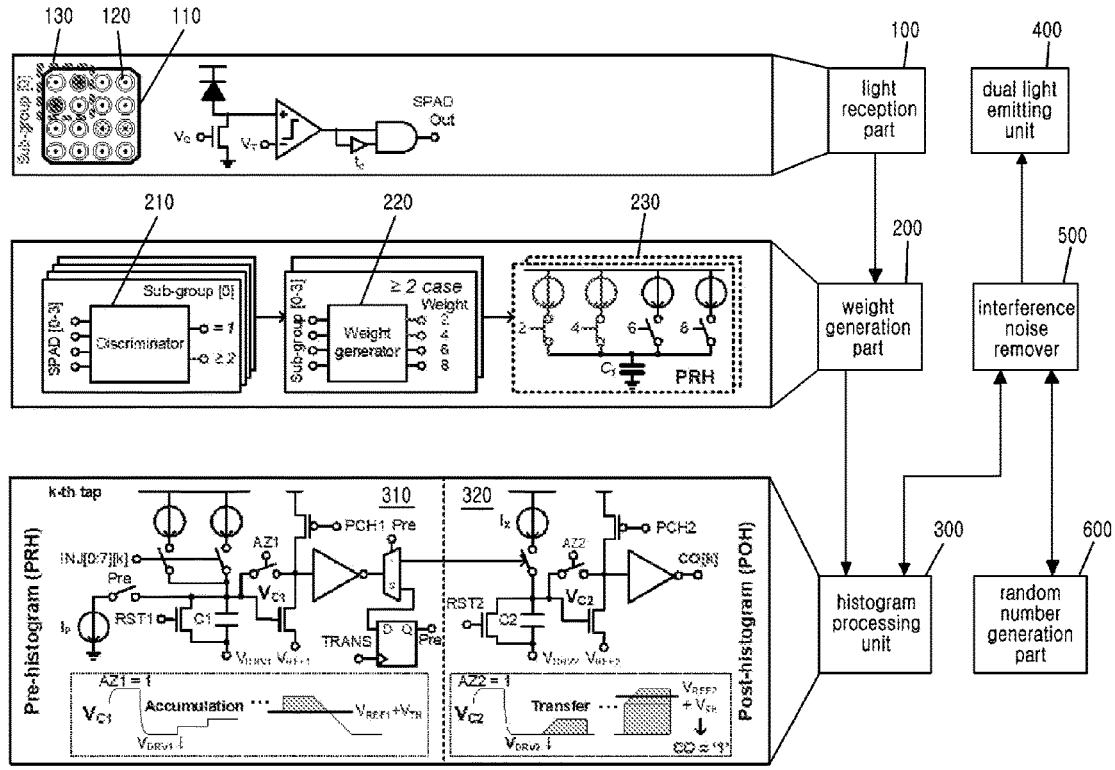
FIG. 1 includes a block diagram and a circuit diagram for describing a Lidar sensor according to the present invention.

FIG. 1 includes a block diagram and a circuit diagram for describing a Lidar sensor according to the present invention.

As shown in FIG. 1, the Lidar sensor of the present invention includes a light reception part 100 which senses reflected light reflected from an object, a weight generation part 200 which generates a weight based on a sensing rate of the reflected light of the light reception part 100, and a histogram processing unit 300 which performs histogram processing of a sensing signal of the light reception part 100 based on the generated weight, and extracts accumulated data values greater than or equal to a reference value to remove noise.

Here, the light reception part 100 may be configured as a pixel array including a plurality of light reception pixels 110.

Further, each light reception pixel 110 may include a plurality of single-photon avalanche diodes (SPADs) 120 which convert the sensed reflected light to an electrical signal.

For example, the light reception part 100 may be configured as a pixel array in which 30 light reception pixels 110 are arranged in a 30×1 array, but the present invention is not limited thereto.

Here, each light reception pixel 110 may be configured as an SPAD array in which 16 single-photon avalanche diodes (SPADs) 120 are arranged in a 4×4 array, but the present invention is not limited thereto.

Next, the weight generation part 200 may include a determiner 210 which divides the plurality of single-photon avalanche diodes (SPADs) 120 included in each light reception pixel 110 of the light reception part 100 into a plurality of sub-groups 130, and determines whether the number of SPADs 120 which simultaneously sense the reflected light in the sub-groups 130 is greater than or equal to a reference number, a weight generator 220 which generates a weight of the sensing signal based on the number of sub-groups 130 greater than or equal to the reference number, and an output device 230 which outputs the generated weight to the histogram processing unit 300.

Here, when determining whether the number of SPADs 120 which simultaneously sense the reflected light is greater than or equal to the reference number, the weight generation part 200 may count the number of SPADs 120 which simultaneously sense the reflected light in the sub-groups, may compare the number of counted SPADs 120 with a preset reference number, and may classify sub-groups 130 corresponding to the number of counted SPADs 120 and may count the number of classified sub-groups 130 when the number of counted SPADs 120 is greater than or equal to the reference number.

Further, when determining whether the number of SPADs 120 which simultaneously sense the reflected light is greater than or equal to the reference number, the weight generation part 200 may set the reference number to approximately 50% of the total number of SPADs 120 in each sub-group 130, but the present invention is not limited thereto.

For example, the weight generation part 200 may set the reference number to two when the total number of SPADs 120 in each sub-group 130 is four, but the present invention is not limited thereto.

Further, when generating the weight, the weight generation part 200 may generate a weight of a sensing signal corresponding to a larger number of sub-groups 130 determined to be greater than or equal to the reference number to be higher than a weight of a sensing signal corresponding to a smaller number of sub-groups 130 determined to be greater than or equal to the reference number.

For example, in a case in which the number of sub-groups 130 of each light reception pixel 110 is four, the weight generation part 200 may generate the weight of the sensing signal corresponding to the sub-group 130 as 2 when the number of sub-groups 130 having a number greater than or equal to the reference number is 1, may generate the weight of the sensing signal corresponding to the sub-group 130 as 4 when the number of sub-groups 130 having a number greater than or equal to the reference number is 2, may generate the weight of the sensing signal corresponding to the sub-group 130 as 6 when the number of sub-groups 130 having a number greater than or equal to the reference number is 3, and may generate the weight of the sensing signal corresponding to the sub-group 130 as 8 when the number of sub-groups 130 having a number greater than or equal to the reference number is 4, but the present invention is not limited thereto.

Next, the histogram processing unit 300 may include a first histogram processing unit 310 and a second histogram processing unit 320.

Here, the first histogram processing unit 310 may be configured as a pre-histogram (PRH) circuit logic, as shown in FIG. 1.

The first histogram processing unit 310 performs histogram processing of the sensing signal of the light reception part 100 based on the generated weight, and is configured to extract the data values greater than or equal to a first reference value from bins of the histogram to firstly remove noise.

Here, when the histogram processing of the sensing signal is performed, the first histogram processing unit 310 may check whether the weight has been generated, and when the weight is generated, the first histogram processing unit 310 may perform the histogram processing by reflecting the generated weight in the data value of the sensing signal.

For example, when checking whether the weight has been generated, the first histogram processing unit 310 may check whether the sensing signal is present when the weight is not generated, and may histogram-process the data value of the sensing signal as 1 when the sensing signal is present.

Further, when checking whether the sensing signal is present, the first histogram processing unit 310 may histogram-process the data value of the sensing signal as 0 when there is no sensing signal.

In addition, when the noise is firstly removed, the first histogram processing unit 310 may check whether the data value of each bin is greater than or equal to the first reference value, may calculate a difference value between the data value of the bin and the first reference value when the data value of the bin is greater than or equal to the first reference value, and may extract the calculated difference value to output the difference value to the second histogram processing unit 320.

In addition, when checking whether the data value of each bin is greater than or equal to the first reference value, the first histogram processing unit 310 may process the data value of the corresponding bin as the noise and remove the noise when the data value of the bin is smaller than the first reference value.

Next, the second histogram processing unit 320 may be configured as a post-histogram (POH) circuit logic as shown in FIG. 1.

The second histogram processing unit 320 may accumulate the data values extracted from the first histogram processing unit 310 to perform histogram processing, and may extract the accumulated data values greater than or equal to the second reference value from bins of the histogram in which the data values are accumulated to secondarily remove noise.

Here, when performing the histogram processing, the second histogram processing unit 320 may generate a bin corresponding to the first data value when receiving the first data value from the first histogram processing unit 310, may generate or accumulate a bin corresponding to a second data value when receiving the second data value from the first histogram processing unit 310, and may generate or accumulate a bin corresponding to an Nth data value when receiving the Nth data value from the first histogram processing unit 310

For example, the second histogram processing unit 320 may check whether the bin corresponding to the second data value is the same as the bin corresponding to the first data value when receiving the second data value from the first histogram processing unit 310, may accumulate the second data value to the first data value of the corresponding bin when the check result is the same, and may generate a new bin corresponding to the second data value when the check result is different.

Further, the second histogram processing unit 320 may check whether the bin corresponding to the Nth data value is a previously generated bin when receiving the Nth data value from the first histogram processing unit 310, may accumulate the Nth data value to the data value of the previously generated bin when the bin is the previously generated bin according to the check result, and may generate a new bin corresponding to the Nth data value when the check result is different.

In addition, when the noise is secondarily removed, the second histogram processing unit 320 may check whether the Nth data value is the last data value when receiving the Nth data value from the first histogram processing unit, and may generate or accumulate a bin corresponding to the last data value and then may extract the accumulated data values greater than or equal to the second reference value from the bins of the histogram when the Nth data value is the last data value according to the check result.

Here, when checking whether the Nth data value is the last data value, the second histogram processing unit 320 may check whether the Nth data value is the last data value based on the preset number of histogram processing.

Further, when the noise is secondarily removed, the second histogram processing unit 320 may check whether the data value of each bin is greater than or equal to the second reference value, and may calculate a difference value between the data value of the bin and the second reference value, and then may extract and output the calculated difference value when the data value of the bin is greater than or equal to the second reference value.

Here, when checking whether the data value of each bin is greater than or equal to the second reference value, the second histogram processing unit 320 may process the data value of the corresponding bin as noise and remove the noise when the data value of the bin is smaller than the second reference value.

Further, the second reference value of the second histogram processing unit 320 may be different from the first reference value of the first histogram processing unit 310.

For example, the second reference value of the second histogram processing unit 320 may be greater than the first reference value of the first histogram processing unit 310.

Further, the first reference value of the first histogram processing unit 310 and the second reference value of the second histogram processing unit 320 may be set based on a noise value and signal sensitivity of the sensor, but the present invention is not limited thereto.

In addition, the Lidar sensor of the present invention may further include a dual light emitting unit 400 which emits first light and second light to the object, and an interference noise remover 500 which controls the dual light emitting unit 400 to vary a light pulse emission delay time and a light pulse time difference (TD) between the first light and the second light in response to the histogram processing performed by the histogram processing unit 300.

Here, in the present invention, the first light and the second light may be emitted from one light emitting unit other than the dual light emitting unit 400.

For example, when the light pulse emission delay time between the first light and the second light varies, the interference noise remover 500 may vary the light pulse emission delay time between the first light and the second light by adjusting emission start times of the first light and the second light to be different from each other.

Further, when the light pulse time difference (TD) between the first light and the second light varies, the interference noise remover 500 may vary the light pulse time difference between the first light and the second light by adjusting optical paths of the first light and the second light to be different from each other.

Next, the interference noise remover 500 may check whether the first histogram processing unit 310 performs the first histogram processing, and then may differently vary emission start times of the first light and the second light when the first histogram processing unit 310 performs the first histogram processing, and may control the dual light emitting unit 400 to keep the light pulse time difference (TD) between the first light and the second light the same.

Here, when checking whether the first histogram processing unit 310 performs the first histogram processing, the interference noise remover 500 may control the dual light emitting unit 400 to differently vary the emission start times of the first light and the second light so that a current light pulse emission delay time is different from a previous light pulse emission delay time, and make a current light pulse time difference (TD) different from a previous light pulse time difference when the first histogram processing unit 310 performs the Nth histogram processing other than the first histogram processing.

For example, the interference noise remover 500 may differently vary a current light pulse emission delay time corresponding to performing the Nth histogram processing and a previous light pulse emission delay time corresponding to performing N−1th histogram processing, and may differently vary the current light pulse time difference (TD) corresponding to performing the Nth histogram processing and the previous light pulse time difference corresponding to performing the N−1th histogram processing.

Further, the interference noise remover 500 may control the dual light emitting unit 400 to keep the light pulse time difference (TD) between the first light and the second light the same while performing the Nth histogram processing.

In addition, the Lidar sensor of the present invention may further include a random number generation part 600 which generates a two-dimensional random number.

Here, the interference noise remover 500 may vary the light pulse emission delay time and the light pulse time difference (TD) between the first light and the second light based on the two-dimensional random number.

For example, the random number generation part 600 may include first and second single-photon avalanche diodes (SPADs), a light blocker which blocks light emitted to any one of the first and second SPADs, and a random number generator connected to the first and second SPADs to generate a random number in response to a pulse to be input, but the present invention is not limited thereto.

Here, the random number generation part 600 may generate a 5-digit two-dimensional random number, but the present invention is not limited thereto.

Further, when the light pulse emission delay time and the light pulse time difference (TD) between the first light and the second light vary, the interference noise remover 500 may control the random number generation part 600 to generate the two-dimensional random number.

Like the above, in the present invention, both high-sensitivity signal sensing and noise removal may be performed by extracting only the data values greater than or equal to the first reference value from the bins of the histogram through the first histogram processing unit 310 to firstly remove noise, and extracting the accumulated data values greater than or equal to the second reference value from the bins of the histogram in which data values extracted from the second histogram processing unit are accumulated to secondarily remove noise.

Further, in the present invention, interference noise between Lidar sensors may be removed by controlling the dual light emitting unit 400 to vary the light pulse emission delay time and the light pulse time difference (TD) between the first light and the second light in response to the histogram processing performed by the first histogram processing unit 310.

Figure 2:
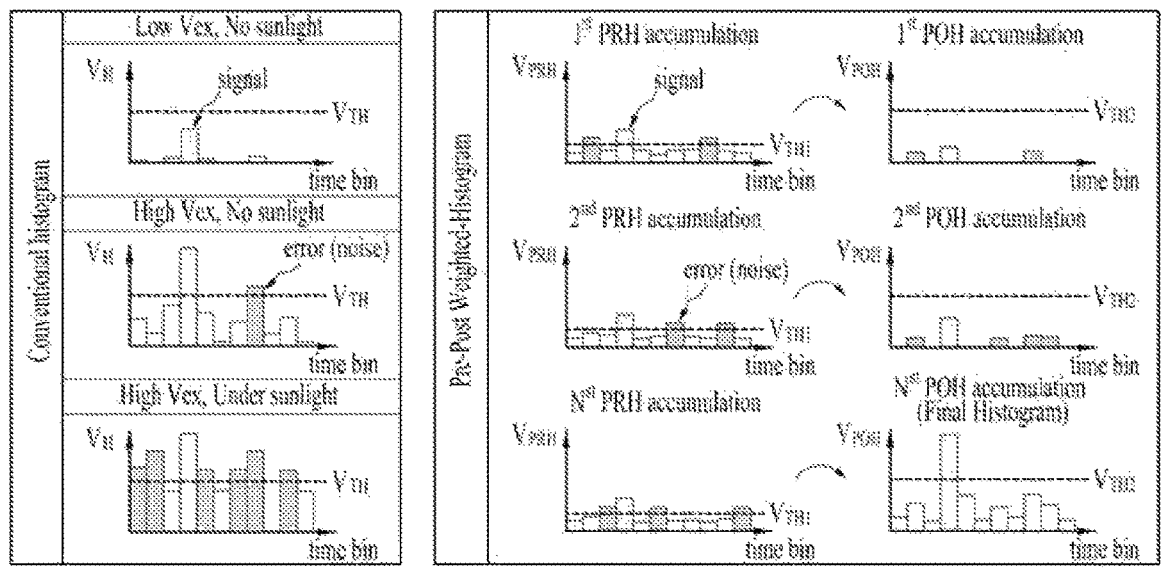
FIG. 2 is a view for describing a noise removal effect of the Lidar sensor according to the present invention.

FIG. 2 is a view for describing a noise removal effect of the Lidar sensor according to the present invention.

As shown in FIG. 2, the left drawing illustrates a conventional histogram method, and the upper left drawing illustrates a case in which Vex (reverse voltage) is low and there is no sunlight, and since there is no sunlight, the data value of the histogram bin which indicates noise (error) is low, but because Vex is low, the data value of the histogram bin which indicates signal sensitivity does not exceed VTH (threshold voltage).

Further, in the middle left drawing, since Vex is increased, it can be seen that, although some data values of the histogram bins which indicate the signal sensitivity exceeds $V_{TH}$, the data value of the histogram bin which indicates the noise also increases, and thus an error occurs.

In addition, in the lower left drawing, it can be seen that the data values of the histogram bins which indicate the noise by increasing Vex also increase, and a number of errors occur due to sunlight.

In contrast, in the right drawing, as a histogram method of the present invention, both high-sensitivity signal sensing and noise removal may be performed through two-step histogram processing by the first histogram processing unit 310 configured as the pre-histogram (PRH) circuit logic and the second histogram processing unit 320 configured as the post-histogram (POH) circuit logic.

The first histogram processing unit of the pre-histogram (PRH) may extract the data values greater than or equal to the first reference value from bins of the histogram which indicates the sensing signal based on the generated weight to firstly remove noise.

Further, when histogram processing of the sensing signal is performed, the first histogram processing unit may check whether the weight has been generated, and when the weight is generated, the first histogram processing unit 310 may perform the histogram processing by reflecting the generated weight in the data value of the sensing signal.

Like the above, the first histogram processing unit may check whether the data value of each bin is greater than or equal to the first reference value, may calculate a difference value between the data value of the bin and the first reference value when the data value of the bin is greater than or equal to the first reference value, and may extract the calculated difference value and output the difference value to the second histogram processing unit 320.

Further, the first histogram processing unit may process the data value of the corresponding bin as noise and remove the noise when the data value of the bin is smaller than the first reference value.

Next, the second histogram processing unit of the post-histogram (POH) may accumulate the data values extracted from the first histogram processing unit 310 to perform histogram processing, and may extract the accumulated data values greater than or equal to the second reference value from bins of the histogram in which the data values are accumulated to secondarily remove noise.

Here, the second histogram processing unit may generate a bin corresponding to the first data value when receiving the first data value from the first histogram processing unit, may generate or accumulate a bin corresponding to the second data value when receiving the second data value from the first histogram processing unit, and may generate or accumulate a bin corresponding to the Nth data value when receiving the Nth data value from the first histogram processing unit.

Further, the second histogram processing unit may check whether the Nth data value is the last data value when receiving the Nth data value from the first histogram processing unit, and may generate or accumulate a bin corresponding to the last data value and then may extract the accumulated data values greater than or equal to the second reference value from the bins of the histogram when the Nth data value is the last data value according to the check result.

Here, the second histogram processing unit may check whether the data value of each bin is greater than or equal to the second reference value, and may calculate a difference value between the data value of the bin and the second reference value, and then may extract and output the calculated difference value when the data value of the bin is greater than or equal to the second reference value.

Further, the second histogram processing unit may process the data value of the corresponding bin as noise and remove the noise when the data value of the bin is smaller than the second reference value.

Figure 3A:
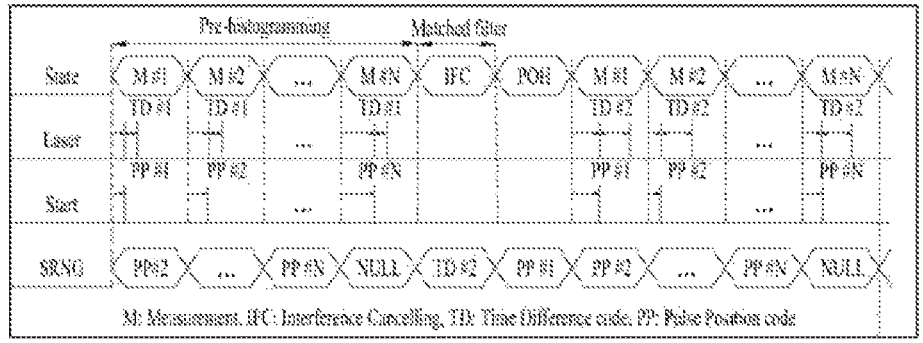
FIGS. 3A to 3C are views for describing a process of removing interference noise according to the present invention.
Figure 3B:
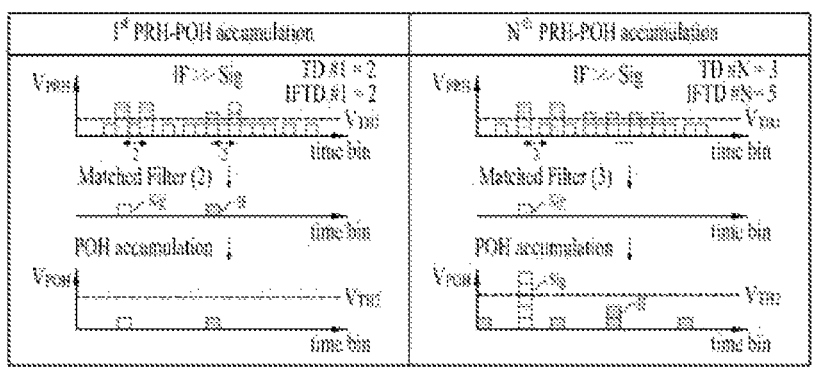
Figure 3C:
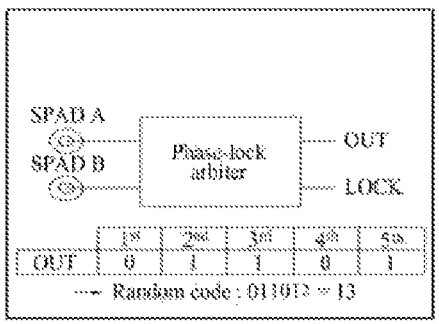

FIGS. 3A to 3C are views for describing a process of removing interference noise according to the present invention.

As shown in FIGS. 3A to 3C, the Lidar sensor of the present invention may remove the interference noise by controlling the dual light emitting unit to vary the light pulse emission delay time (PP) and the light pulse time difference (TD) between the first light and the second light through the interference noise remover in response to the histogram processing performed by histogram processing unit.

The interference noise remover may check whether the first histogram processing unit of the pre-histogram (PRH) performs the first histogram processing, and then may differently vary the emission start times (PP) of the first light and the second light, and may control the dual light emitting unit to keep the light pulse time difference (TD) between the first light and the second light the same when the first histogram processing unit performs the first histogram processing.

Here, the interference noise remover may control the dual light emitting unit to differently vary the emission start times (PP) of the first light and the second light so that the current light pulse emission delay time is different from the previous light pulse emission delay time, and make the current light pulse time difference (TD) different from the previous light pulse time difference when the first histogram processing unit performs the Nth histogram processing other than the first histogram processing.

For example, the interference noise remover may differently vary the current light pulse emission delay time corresponding to performing the Nth histogram processing and the previous light pulse emission delay time corresponding to performing N−1th histogram processing, and may differently vary the current light pulse time difference (TD) corresponding to performing the Nth histogram processing and the previous light pulse time difference corresponding to performing the N−1th histogram processing.

Further, the interference noise remover may control the dual light emitting unit to keep the light pulse time difference (TD) between the first light and the second light the same while performing Nth histogram processing.

Accordingly, as shown in FIG. 3B, in the pre-histogram (PRH) processing, when the light pulse time difference (TD) of the sensing signal and a light pulse time difference (IFTD) of the interference noise are the same, the interference noise between the Lidar sensors is not removed, and the sensing signal and the interference noise may be transferred together to post-histogram (POH) processing.

However, while performing the Nth histogram processing, since the light pulse time difference (TD) of the sensing signal and the light pulse time difference (IFTD) of the interference noise are different, even when an IF signal, which is interference noise, is strong, the interference noise is removed and only the sensing signal may be transferred to post-histogram (POH) processing.

Further, in the post-histogram (POH), even when the sensing signal and the interference noise are transferred together from the pre-histogram (PRH), since only the sensing signal accumulates more than the interference noise, it is possible to remove the interference noise, and thus a correct TOF value may be known.

In addition, as shown in FIG. 3C, the Lidar sensor of the present invention may further include the random number generation part which generates a two-dimensional random number.

That is, the interference noise remover of the present invention may vary the light pulse emission start times (PP) and the light pulse time difference (TD) between the first light and the second light based on the two-dimensional random number.

For example, the random number generation part may be configured as a circuit through a noisy SPAD, which blocks light and intentionally forms a defect in a p-type substrate region to generate noise.

Two noisy SPADs are connected to a phase-lock arbiter (PLA), and a random number code may be configured according to whether noise occurs first in SPAD A or SPAD B and a value of 1 appears.

For example, when noise occurs first in SPAD A, a value of 0 is displayed, and when noise occurs first in SPAD B, a value of 1 may be output, and in FIG. 3A, this is repeated 5 times to generate a 5-digit two-dimensional random number.

Like the above, the random number generation part may generate the 5-digit two-dimensional random number, but the present invention is not limited thereto.

Figure 4:
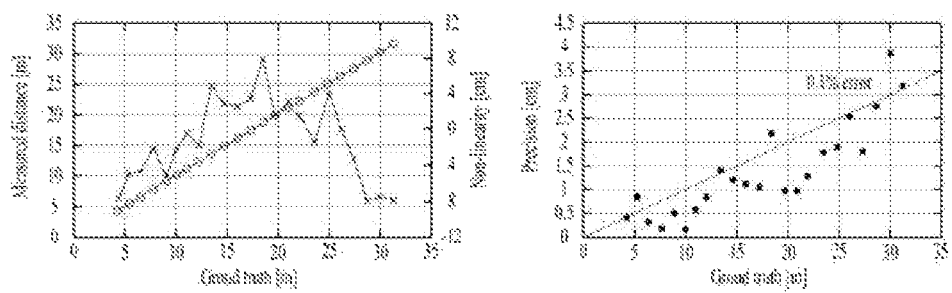
FIG. 4 is a set of views for describing the outdoor sensitivity of the Lidar sensor according to the present invention.
Figure 5:
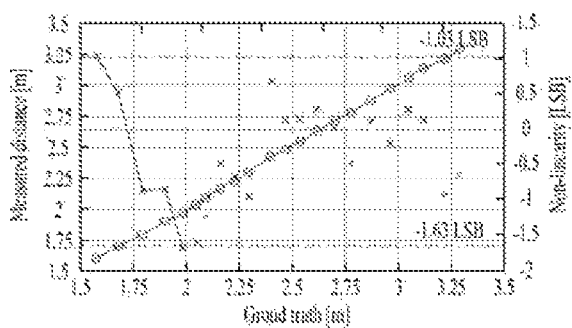
FIG. 5 is a view for describing the indoor sensitivity of the Lidar sensor according to the present invention.

FIGS. 4A and 4B are views for describing the outdoor sensitivity of the Lidar sensor according to the present invention, and FIG. 5 is a view for describing the indoor sensitivity of the Lidar sensor according to the present invention.

As shown in FIGS. 4A, 4B, and 5, the present invention measures a sensing signal for a distance of approximately 4 m to 32 m in an external environment with sunlight of approximately 105 klx, and FIG. 4A is a graph illustrating nonlinearity according to the measurement distance, FIG. 4B is a graph illustrating accuracy as a depth measured approximately 1000 times for each point, and FIG. 5 is a graph illustrating nonlinearity according to the measurement distance in an internal environment.

Like the above, it can be seen that the Lidar sensor of the present invention may sense a high-sensitivity signal even in a noise environment of sunlight of approximately 105 klx and increase accuracy.

Like the above, in the present invention, both high-sensitivity signal sensing and noise removal may be performed by extracting only the data values greater than or equal to the first reference value from the bins of the histogram through the first histogram processing unit to firstly remove noise, and extracting only the accumulated data values greater than or equal to the second reference value from bins of the histogram in which data values extracted from the second histogram processing unit are accumulated to secondarily remove noise.

Further, in the present invention, the interference noise between the Lidar sensors may be removed by controlling the light emitting unit to vary the light pulse emission delay time and the light pulse time difference (TD) between the first light and the second light in response to the histogram processing performed by the first histogram processing unit.

A method of removing the noise of the Lidar sensor of the present invention will be described as follows.

First, in the present invention, reflected light reflected from the object may be sensed.

Subsequently, in the present invention, a weight may be generated based on the sensing rate of the reflected light of the light reception part.

Here, in the present invention, the plurality of single-photon avalanche diodes (SPADs) included in each light reception pixel of the light reception part may be divided into a plurality of sub-groups, whether the number of SPADs which simultaneously sense the reflected light in the sub-groups is greater than or equal to the reference number may be determined, and a weight of the sensing signal based on the number of sub-groups greater than or equal to the reference number may be generated.

Next, in the present invention, the histogram processing of the sensing signal of the light reception part may be performed based on the generated weight, and the data values greater than or equal to the first reference value from the bins of the histogram may be extracted to firstly remove noise.

Here, in the present invention, whether the weight has been generated may be checked, and when the weight is generated, the histogram processing may be performed by reflecting the generated weight in the data value of the sensing signal.

For example, in the present invention, whether the data value of each bin is greater than or equal to the first reference value may be checked, the difference value between the data value of the bin and the first reference value may be calculated when the data value of the bin is greater than or equal to the first reference value, and the data value of the corresponding bin may be processed as noise and the noise may be removed when the data value of the bin is smaller than the first reference value.

Subsequently, in the present invention, the extracted data values may be accumulated to perform histogram processing, and the accumulated data values greater than or equal to the second reference value may be extracted from bins of the histogram in which the data values are accumulated to secondarily remove noise.

Here, in the present invention, a bin corresponding to the first data value may be generated when the first data value is received, a bin corresponding to the second data value may be generated or accumulated when the second data value is received, and a bin corresponding to the Nth data value may be generated or accumulated when the Nth data value is received.

Further, in the present invention, whether the Nth data value is the last data value may be checked when the Nth data value is received, and a bin corresponding to the last data value may be generated or accumulated and then the accumulated data values greater than or equal to the second reference value may be extracted from the bins of the histogram when the Nth data value is the last data value according to the check result.

Here, in the present invention, whether the data value of each bin is greater than or equal to the second reference value may be checked, the difference value between the data value of the bin and the second reference value may be calculated, and then the calculated difference value may be extracted and output when the data value of the bin is greater than or equal to the second reference value, and the data value of the corresponding bin may be processed as noise and the noise may be removed when the data value of the bin is smaller than the second reference value.

Further, in the present invention, the interference noise between the Lidar sensors may be removed by varying the light pulse emission delay time and the light pulse time difference (TD) between the first light and the second light in response to the histogram processing.

For example, in the present invention, the emission start times of the first light and the second light may be differently varied when the first histogram processing is performed, and the light pulse time difference (TD) between the first light and the second light may be kept the same.

Further, in the present invention, the emission start times of the first light and the second light may be varied so that the current light pulse emission delay time is different from the previous light pulse emission delay time, and the current light pulse time difference (TD) may be varied to be different from the previous light pulse time difference when the Nth histogram processing other than the first histogram processing is performed.

That is, in the present invention, the current light pulse emission delay time corresponding to performing the Nth histogram processing and the previous light pulse emission delay time corresponding to performing N−1th histogram processing may be differently varied, and the current light pulse time difference (TD) corresponding to performing the Nth histogram processing and the previous light pulse time difference corresponding to performing the N−1th histogram processing may be differently varied.

Here, in the present invention, a two-dimensional random number may be generated, and the light pulse emission delay time and the light pulse time difference (TD) between the first light and the second light may be varied based on the two-dimensional random number.

The features, structures, effects, and the like described above in the present invention are included in at least one embodiment of the present invention, and are not necessarily limited to only one embodiment. Further, the features, the structures, the effects, and the like may be combined or modified for other embodiments by those skilled in the art. Accordingly, it should be understood that the contents related to these combinations and modifications are included in the scope of the present invention.

Further, in the above, the embodiment has been mainly described, but this is only an example and does not limit the present invention, each component specifically shown in the embodiment may be implemented by modification. Further, it should be understood that differences related to these modifications and applications are included in the scope of the present invention defined in the appended claims.

| (Description of Symbols) | |
|---|---|
| 100: light reception part | 200: weight generation part |
| 300: histogram processing unit | 400: light emitting unit |
| 500: interference noise remover | 600: random number generation part |

The invention claimed is:

1. A Lidar sensor comprising:
a light reception part configured to sense reflected light reflected from an object;
a weight generation part configured to generate a weight based on a sensing rate of the reflected light of the light reception part;
a first histogram processing unit configured to perform histogram processing of a sensing signal of the light reception part based on the generated weight, and extract data values greater than or equal to a first reference value from bins of the histogram to firstly remove noise; and a second histogram processing unit configured to accumulate the data values extracted from the first histogram processing unit to perform histogram processing, and extract the accumulated data values greater than or equal to a second reference value from bins of a histogram in which the data values are accumulated to secondarily remove the noise,
wherein, when the noise is firstly removed, the first histogram processing unit checks whether the data value of each bin is greater than or equal to the first reference value, calculates a difference value between the data value of the bin and the first reference value when the data value of the bin is greater than or equal to the first reference value, and extracts the calculated difference value and outputs the difference value to the second histogram processing unit.

2. The Lidar sensor of claim 1,
wherein the weight generation part divides a plurality of single-photon avalanche diodes (SPADs) included in each light reception pixel of the light reception part into a plurality of sub-groups, determines whether the number of SPADs which simultaneously sense the reflected light in the sub-groups is greater than or equal to a reference number, generates a weight of the sensing signal based on the number of sub-groups greater than or equal to the reference number, and outputs the generated weight to the first histogram processing unit.

3. The Lidar sensor of claim 1,
wherein the first histogram processing unit checks whether the weight is generated when performing the histogram processing of the sensing signal, and reflects the generated weight in the data value of the sensing signal to perform the histogram processing when the weight is generated.

4. The Lidar sensor of claim 1,
wherein, when the histogram processing is performed, the second histogram processing unit generates a bin corresponding to a first data value when receiving the first data value from the first histogram processing unit, generates or accumulates a bin corresponding to a second data value when receiving the second data value from the first histogram processing unit, and generates or accumulates a bin corresponding to an Nth data value when receiving the Nth data value from the first histogram processing unit.

5. The Lidar sensor of claim 4,
wherein the second histogram processing unit checks whether the bin corresponding to the second data value is the same as the bin corresponding to the first data value when receiving the second data value from the first histogram processing unit, accumulates the second data value to the first data value of the corresponding bin when the check result is the same, and generates a new bin corresponding to the second data value when the check result is different.

6. The Lidar sensor of claim 4,
wherein the second histogram processing unit checks whether the bin corresponding to the Nth data value is a previously generated bin when receiving the Nth data value from the first histogram processing unit, accumulates the Nth data value to the data value of the previously generated bin when the bin is the previously generated bin according to the check result, and generates a new bin corresponding to the Nth data value when the check result is different.

7. The Lidar sensor of claim 1,
wherein, when the noise is secondarily removed, the second histogram processing unit checks whether the Nth data value is the last data value when receiving the Nth data value from the first histogram processing unit, and generates or accumulates a bin corresponding to the last data value and then extracts the accumulated data values greater than or equal to the second reference value from the bins of the histogram when the Nth data value is the last data value according to the check result.

8. A Lidar sensor comprising:
a light reception part configured to sense reflected light reflected from an object;
a weight generation part configured to generate a weight based on a sensing rate of the reflected light of the light reception part;
a first histogram processing unit configured to perform histogram processing of a sensing signal of the light reception part based on the generated weight, and extract data values greater than or equal to a first reference value from bins of the histogram to firstly remove noise; and
a second histogram processing unit configured to accumulate the data values extracted from the first histogram processing unit to perform histogram processing, and extract the accumulated data values greater than or equal to a second reference value from bins of a histogram in which the data values are accumulated to secondarily remove the noise,
wherein, when the noise is secondarily removed, the second histogram processing unit checks whether the data value of each bin is greater than or equal to the second reference value, and calculates a difference value between the data value of the bin and the second reference value, and then extracts and outputs the calculated difference value when the data value of the bin is greater than or equal to the second reference value.

9. The Lidar sensor of claim 8,
wherein, when checking whether the data value of each bin is greater than or equal to the second reference value, the second histogram processing unit processes the data value of the corresponding bin as noise and removes the noise when the data value of the bin is smaller than the second reference value.

10. The Lidar sensor of claim 8, further comprising:
a light emitting unit configured to emit first light and second light to the object; and
an interference noise remover configured to control the light emitting unit to vary a light pulse emission delay time and a light pulse time difference (TD) between the first light and the second light in response to the histogram processing performed by the first histogram processing unit.

11. The Lidar sensor of claim 10,
wherein the interference noise remover checks whether the first histogram processing unit performs first histogram processing, and controls the light emitting unit to differently vary emission start times of the first light and the second light and keep the light pulse time difference (TD) between the first light and the second light the same when the first histogram processing unit performs the first histogram processing.

12. The Lidar sensor of claim 10,
wherein, when checking whether the first histogram processing unit performs first histogram processing, the interference noise remover controls the light emitting unit to differently vary emission start times of the first light and the second light so that a current light pulse emission delay time is different from a previous light pulse emission delay time, and make a current light pulse time difference (TD) different from a previous light pulse time difference when the first histogram processing unit performs Nth histogram processing other than the first histogram processing.

13. The Lidar sensor of claim 10, further comprising a random number generation part configured to generate a two-dimensional random number,
wherein the interference noise remover varies the light pulse emission delay time and the light pulse time difference (TD) between the first light and the second light based on the two-dimensional random number.

14. A method of removing noise of a Lidar sensor including a light reception part, a weight generation part, a histogram processing unit, and an interference noise remover, the method comprising:
sensing, by the light reception part, reflected light reflected from an object;
generating, by the weight generation part, a weight based on a reflected light sensing rate of the light reception part;
performing, by the histogram processing unit, histogram processing of a sensing signal of the light reception part based on the generated weight, and extracting data values greater than or equal to a first reference value from bins of the histogram to firstly remove noise; and
accumulating, by the histogram processing unit, the extracted data values to perform the histogram processing, and extracting accumulated data values greater than or equal to a second reference value from the bins of the histogram in which the data values are accumulated to secondarily remove the noise,
wherein, when the noise is firstly removed, checking whether the data value of each bin is greater than or equal to the first reference value, calculating a difference value between the data value of the bin and the first reference value when the data value of the bin is greater than or equal to the first reference value, and extracting the calculated difference value and outputs the difference value to the second histogram processing unit,
wherein the checking, calculating, and extracting steps are carried out by the first histogram processing unit.

* * * * *